(12) United States Patent
Ruppert et al.

(10) Patent No.: US 6,738,902 B1
(45) Date of Patent: May 18, 2004

(54) SYSTEMS AND METHODS FOR CONTROLLING AUTHORIZED INTERCEPT

(75) Inventors: William Henry Ruppert, Scottsdale, AZ (US); Pamela Tam Carmony, Tempe, AZ (US); Erwin Perry Comer, Queen Creek, AZ (US); William Turner Scott, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/483,242

(22) Filed: Jan. 14, 2000

(51) Int. Cl.[7] .......................... H04L 9/00; H04M 11/00
(52) U.S. Cl. .................. 713/162; 455/410; 455/515; 455/67.11
(58) Field of Search .................. 455/405, 428, 455/12.1, 13.1, 67.11, 410, 427, 430, 515, 560; 713/152, 162; 380/28, 30, 43, 239, 282; 379/35

(56) References Cited

U.S. PATENT DOCUMENTS 5,946,618 A * 8/1999 Agre et al. .................. 455/428
6,122,499 A * 9/2000 Magnusson .................. 455/405

* cited by examiner

Primary Examiner—Emmanuel L. Moise
(74) Attorney, Agent, or Firm—Timothy J. Lorenz

(57) ABSTRACT

Authorized intercepts of communications in a communications system such as a satellite communications system (10) are controlled. Each law enforcement agency (LEA) can only intercept communications to subscriber units (SUs) within its jurisdiction. In addition, the identity of each authorized intercept target is known only to the requesting LEA. In one embodiment, a trusted entity, such as a network operations facility (NOF 22, FIG. 3), creates a list of ID's corresponding to all SUs within each LEA's jurisdiction. Each SU ID is provided both unencrypted and encrypted for one or more network nodes (NN 1–R, FIG. 3). A network intercept facility (IF 201, FIG. 3) selects a target SU ID, generates an intercept order encrypted for one or more NNs, and sends it to one or more NNs for execution.

25 Claims, 6 Drawing Sheets

SYSTEMS AND METHODS FOR CONTROLLING AUTHORIZED INTERCEPT

FIELD OF THE INVENTION

This invention relates generally to communications systems and, in particular, to systems and methods for controlling authorized intercept of communications within a communications system.

BACKGROUND OF THE INVENTION

Many countries in which communications networks, such as but not limited to telecommunications networks, operate have communications interception or wiretap laws. Such laws require communications service providers to enable legal entities to intercept specified communications taking place within their jurisdiction.

One constraint on authorized intercept operations is that, in order to maintain the integrity of the intercept operation, legal entities that are conducting intercept operations desire that the identity of intercept targets be maintained secret from all but the legal entities themselves. This means that intercept target identities are desired to be kept secret from the communications systems that are implementing the intercept.

Another constraint on authorized intercept operations is that legal entities are required by law to limit their intercept operations to their respective jurisdictions. For example, a law enforcement agency (LEA) is required to restrict any authorized intercept operations to just the jurisdiction for which it is authorized to conduct such operations. As the population of mobile subscriber products, such as cellular telephones, pagers, mobile radios, and other wireless communications devices, proliferates throughout the world, it is becoming increasingly difficult for LEAs, and the operators of the communications systems whose communications the LEAs are intercepting, to know with certainty whether intercept targets are within their respective jurisdictions.

In the case of satellite-based communications systems, it is particularly challenging for an LEA to know whether a particular intercept target is within its jurisdiction, because the target subscriber could be anywhere in the world, and because communications with such subscriber can be conducted through a network of satellites without going through any land-based telephone office, such as a public switched telephone network (PSTN) station or a cellular telephone base station, which heretofore have conveniently provided authorized intercept capability to LEAs.

Accordingly, there is a significant need for systems and methods that can control authorized intercepts within a communications system by maintaining the identity of intercept targets secret from all but the legal entities themselves.

There is also a significant need for systems and methods that can control authorized intercepts within a communications system by limiting the intercept operations of LEAs to their respective jurisdictions.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

Figure 1:
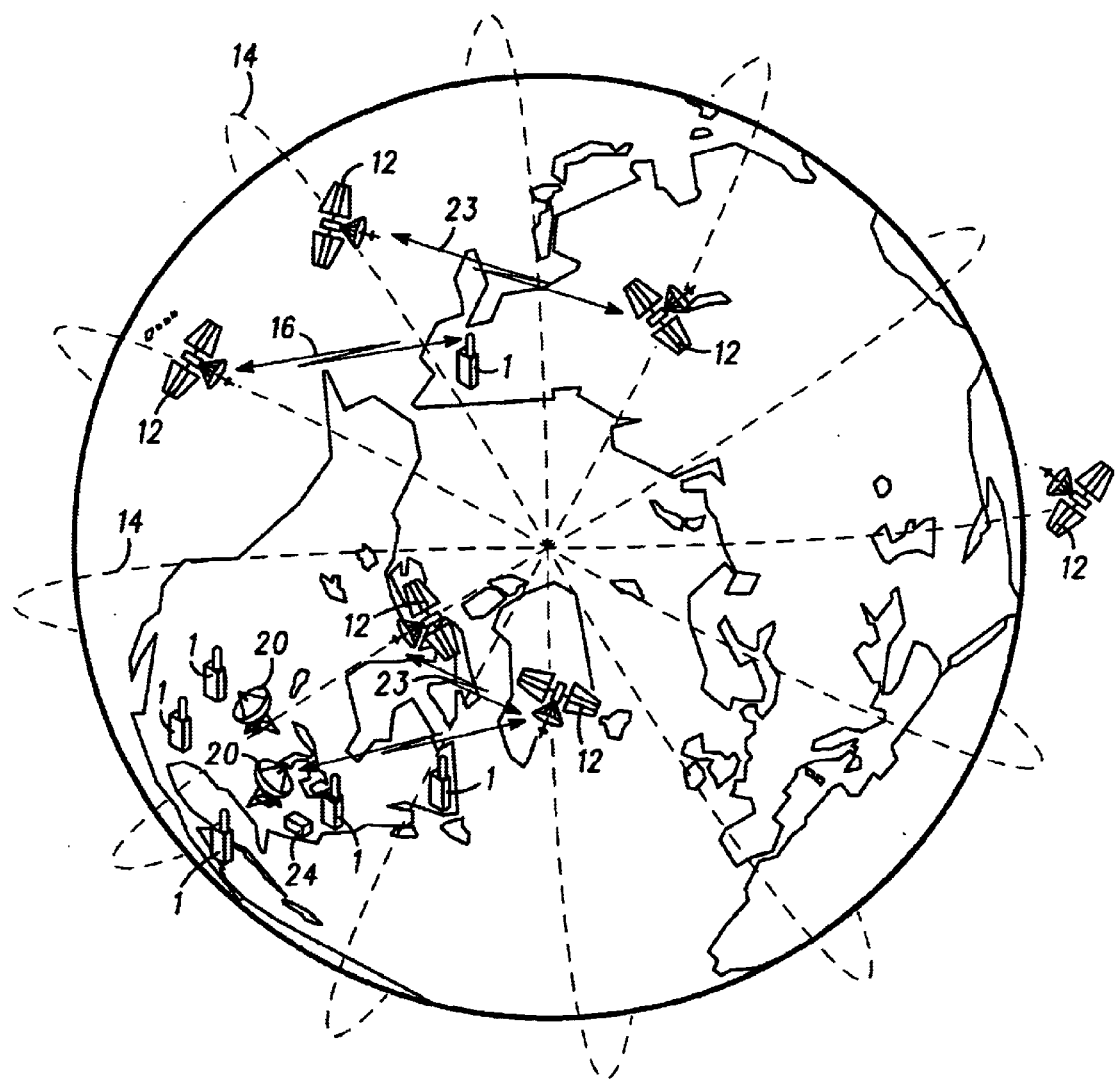
FIG. 1 depicts a simplified diagram of a satellite-based communications system with which the present invention may be practiced.

A "facility" is defined herein to mean a structural, operational, organizational, and/or logical entity for performing one or more functions.

A "jurisdiction" is defined herein to mean a physical, hierarchical, organizational, or logical area over which an entity exercises authority. For example, a "jurisdiction" can be a geographical area that comprises all or a portion of a city, a country, or the earth. A "jurisdiction" can also be all or a portion of an organization, a demographic group, technology class (e.g. telephone subscribers, computer subscribers, pager subscribers, etc.), or any other defined category.

A "boundary" is defined herein to mean the border or limits of a "jurisdiction" and can be physical, geographical, organizational, logical, or any other attribute that characterizes the border or limits of a "jurisdiction".

A "satellite" is defined herein to mean a man-made object or vehicle intended to orbit Earth and includes both geostationary and orbiting satellites and/or combinations thereof including low earth orbiting (LEO) satellites.

A "constellation" is defined herein to mean an ensemble of satellites arranged in orbits for providing wireless communications coverage of portion(s) or all of the earth. A constellation typically includes multiple rings (or planes) of satellites and can have equal numbers of satellites in each plane, although this is not essential.

A "subscriber unit" (SU) is defined herein to mean any wireless communications device such as a cellular telephone, pager, personal digital assistant, computer, radio, selective communication device, transponder, telemetry device, or the like.

The terms "antenna pattern", "cell", "cell pattern", "communications", and "coverage area" as used herein are not intended to be limited to any particular mode of generation and include those created by either terrestrial or satellite communications systems and/or combinations thereof.

The terms "communications facility" and "network node" as used herein are not limited to any particular type of communications entity and comprise satellites and/or earth stations.

The term "authentication", as applied to the processes of encryption and decryption, is used herein to mean that the intended recipient of encrypted information knows with assurance who sent it.

The term "confidentiality", as applied to the processes of encryption and decryption, is used herein to mean that only the intended recipient of encrypted information can read it.

The term "integrity", as applied to the processes of encryption and decryption, is used herein to mean that the intended recipient of encrypted information knows with assurance that it has not been modified.

The term "encrypted" and variants thereof such as "encrypt", as applied to the processes of encryption and decryption, is used herein to mean that the authentication, confidentiality, and/or integrity of information can be assured.

The term "location" as used herein is not limited to geolocation and means location of any type, such as physical, geographical, organizational, and/or logical position of an entity, such as a subscriber unit, of a communications system.

FIG. 1 illustrates a simplified diagram of a satellite-based communications system with which the present invention may be practiced. Although the present invention is not limited to a satellite-based communications system and can be used with any type of communications system, the invention will be described as implemented in a commercial satellite-based communications system.

There are a number of commercial satellite-based communications systems. Most or all of them have many common system characteristics. For example, each satellite system has a number of earth stations called "gateways" located at various parts of the world. A gateway can be used for connecting or establishing a communication between an SU and a land-based telephone line, or a communication between two SUs. When the communication is directly between two SUs, the gateway connections that were made to set up the communications link are cut-away after a series of initial connections that were needed to set up the communication. Such a series of connections may include at least a connection through a network of satellites. Once the gateway connection is cut-away, the two SUs communicate directly through the network of satellites, or they may communicate through the network of satellites and a "visiting" gateway other than the gateway that has set up the communication.

An overview of the operation and components of one such satellite-based communications system will now be described with reference to FIG. 1.

Communications system 10 comprises a plurality of satellites 12 moving in a number of polar orbits 14, with each orbit 14 holding several satellites 12. The present invention can be used with a large number of satellites or with a single satellite. For clarity, FIG. 1 illustrates only a few of satellites 12.

For example, each orbit 14 encircles Earth at a relatively low altitude of several hundred kilometers. Due to the relatively low orbits of exemplary satellites 12, substantially line-of-sight wireless (e.g., radio, light, etc.) transmission from any one satellite 12 or reception of signals by any one satellite 12 involves or covers a relatively small area of Earth at any instant. For the example shown, satellites 12 travel with respect to Earth at around 25,000 km/hr, allowing satellite 12 to be visible to an SU or an earth station such as a gateway for a maximum period of circa nine minutes.

The present invention is applicable to systems including satellites having low-Earth, medium-Earth and geosynchronous orbits. Additionally, it is applicable to orbits having any angle of inclination (e.g., polar, equatorial or other orbital pattern).

Satellites 12 communicate with radio communication subscriber units (SUs) 1 and with earth stations such as network management facility (NMF) 24 and one or more gateways 20. Other earth stations (not shown in FIG. 1) can be employed in the system, such as intercept facilities (IFs); network operations facilities (NOFs); telemetry, tracking, and control (TTAC) facilities; and the like. Alternatively, the functions provided by some or all of these earth stations can be combined.

SUs 1 can be located anywhere on the surface of the Earth or in the atmosphere above the Earth. In one embodiment, SUs 1 are communications devices capable of transmitting data to and receiving data from satellites 12. By way of example, SUs 1 can be hand-held, portable cellular telephones adapted to communicate with satellites 12. Ordinarily, SUs 1 need not perform any substantial control functions for communications system 10.

System 10 can accommodate any number, potentially in the millions, of SUs 1. In one embodiment of the present invention, SUs 1 communicate with nearby satellites 12 via subscriber links 16. Subscriber links 16 encompass a limited portion of the electromagnetic spectrum that is divided into numerous channels. Subscriber links 16 can encompass Frequency Division Multiple Access (FDMA), Time Division Multiple Access (TDMA), Code Division Multiple Access (CDMA), or other channel diversity schemes or combinations thereof.

In one embodiment, a satellite 12 continuously transmits over one or more broadcast channels. SUs 1 synchronize to broadcast channels and monitor broadcast channels to detect data messages which can be addressed to them. Broadcast channels can also contain status information regulating access to satellite 12. In one embodiment, this status information informs SUs 1 regarding access or denial of new subscribers to satellite 12. SUs 1 can transmit messages to satellites 12 over one or more acquisition channels. Broadcast channels and acquisition channels are not dedicated to any one SU 1 but are shared by all SUs 1 currently within view of a satellite 12.

SUs 1 that are turned on use an acquisition channel to periodically report their location via a nearby satellite 12 to the system 10. The location data can be stored, for example, in the SU's "home" gateway, in a network operations facility (22, FIG. 3), and/or in the system's NMF 24. Location data can take the form of geolocation data indicating the position coordinates relative to the surface of the earth of every active SU 1 in system 10. Any suitable technique for determining location can be used and can be implemented in a known manner.

Traffic channels are two-way channels that are assigned to particular SUs 1 by satellites 12 from time to time. In one embodiment of the present invention, a digital format is used to communicate data over certain traffic channels, and other traffic channels support voice communications. At least one traffic channel is assigned for each communication, and each traffic channel has sufficient bandwidth to support, as a minimum, a two-way voice conversation. Preferably, each satellite 12 supports up to a thousand or more traffic channels, so that each satellite 12 can simultaneously service a like number of independent communications.

Satellites 12 communicate with other nearby satellites 12 through crosslinks 23. Thus, a communication from an SU 1 located at any point on or near the surface of the earth can be routed through the constellation of satellites 12 to within range of substantially any other point on the surface of the earth. A communication can be routed down to an SU 1 on or near the surface of the earth from a satellite 12 using a subscriber link 16.

Alternatively, a communication can be routed down to or up from any of many gateways 20, of which FIG. 1 shows only two, through earth-links (also called "feeder links") 15. Gateways 20 are preferably distributed over the surface of the earth in accordance with geopolitical boundaries. In one embodiment, each satellite 12 can communicate with up to four gateways 20 and with over a thousand SUs 1 at any given instant.

Network management facility 24 monitors the health and status of system communication nodes (e.g., gateways 20 and satellites 12) and desirably manages operations of communications system 10.

Gateways 20 can perform communication processing functions in conjunction with satellites 12, or gateways 20 can exclusively handle communication processing and allocation of communication handling capacity within communications system 10. Diverse terrestrial-based communications systems, such as the PSTN, can access communications system 10 through gateways 20.

In the present invention, a special-purpose gateway called an "intercept facility" (IF) (e.g. IFs 201 and 202, FIG. 3) can be provided to enable law enforcement agencies (LEAs) to perform communications intercepts. An "intercept facility" may also be referred to as a "mediation function", because its operations include keeping intercept requests of LEAs separate and distinct. Alternatively, the functions of IFs can be provided within ordinary gateways 20 or within any other terrestrial facility of communications system 10.

With the example constellation, at least one of satellites 12 is within view of virtually every point on Earth's surface at all times (i.e., virtually full coverage of the Earth's surface is obtained). Theoretically, any satellite 12 can be in direct or indirect data communication with any SU 1 or gateway 20 at any time by routing data through the constellation of satellites 12. Accordingly, communications system 10 can establish a plurality of communication paths for relaying information through the communications system 10, including through the constellation of satellites 12 between any two SUs 1, between NMF 24 and a gateway 20, between any two gateways 20, and between an SU 1 and a gateway 20.

Figure 2:
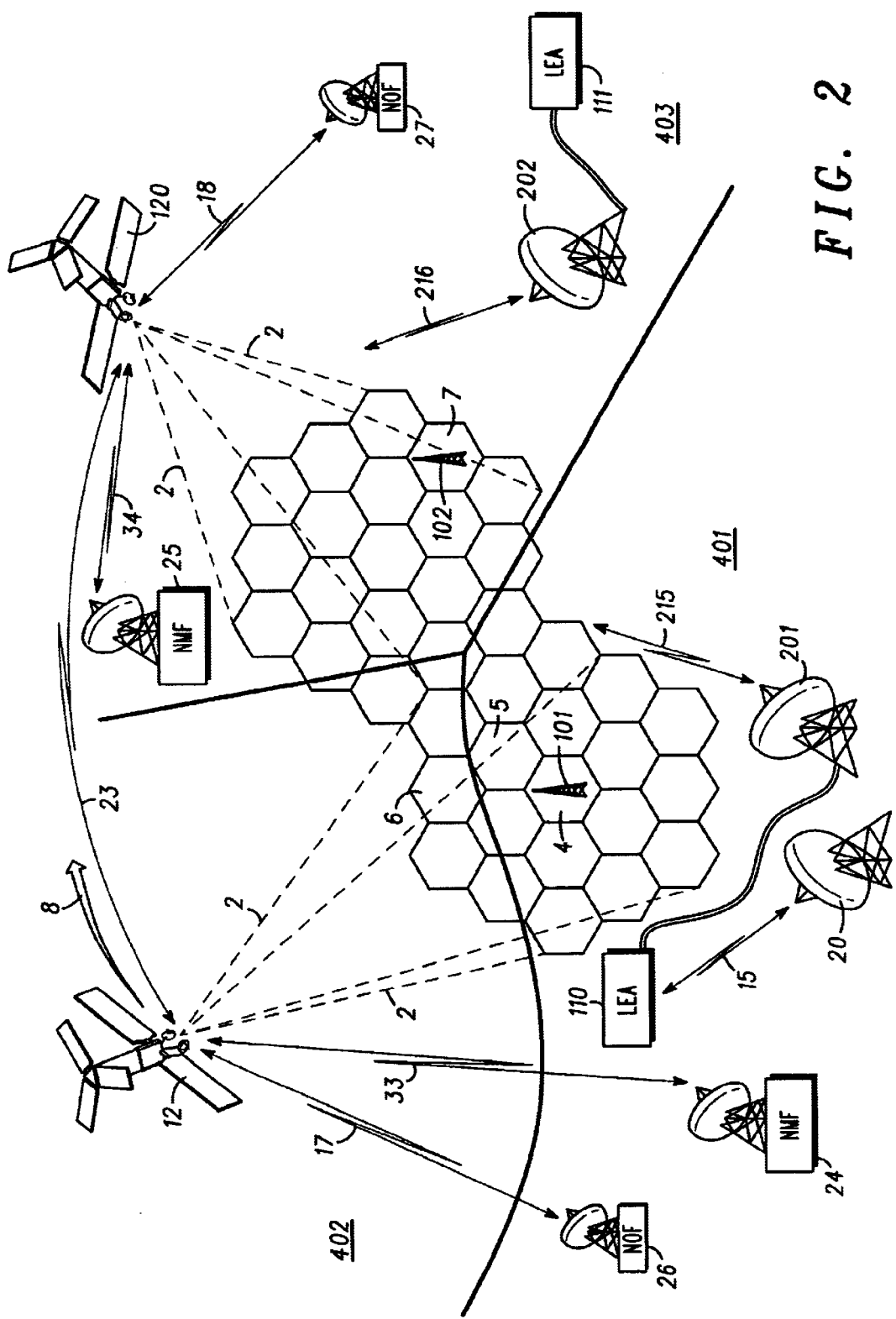
FIG. 2 depicts a more detailed diagram of a satellite-based cellular communications system with which the present invention may be practiced.

FIG. 2 depicts a more detailed diagram of a satellite-based cellular communications system with which the present invention may be practiced. As shown, the communications system comprises network operations facilities (NOFs) 26 and 27, network management facilities (NMF) 24 and 25, gateway 20, specialized gateways called intercept facilities (IFs) 201 and 202, and multi-beam satellites 12 and 120.

NOFs 26 and 27 perform various operational functions to support communications system 10, including the generation and maintenance of a data structure 30 (FIG. 3) which includes SU IDs and information concerning the boundaries of jurisdictions, as described in greater detail below regarding FIG. 3. NOF 26 can communicate with a satellite 12 via an earth-link 17; similarly, NOF 27 can communicate with a satellite 120 via an earth-link 18. NOFs 26 and 27, like other earth stations, can also communicate both wirelessly and via wireline with terrestrial nodes (not shown) that can be part of communications system 10 or part of other communications systems (not shown).

NMFs 24 and 25 perform various management functions to support communications system 10. NMF 24 can communicate with a satellite 12 via an earth-link 33; similarly, NMF 25 can communicate with a satellite 120 via an earth-link 34.

Satellites 12 and 120 project multi-beam antenna patterns 2, such as cell patterns 4-7, onto the face of the earth. Cell patterns 4 and 7 cover SUs 101 and 102, respectively. While only a single SU 101, 102 is shown in cell patterns 4 and 7, respectively, of the antenna patterns 2 of satellites 12 and 120, it will be understood that ordinarily many SUs will be covered by each cell pattern 4-7.

To initiate communications from, for example, SU 101 to SU 102, SU 101 inputs an addressing ID, such as a phone number, for SU 102. A signal bearing SU 101's unique subscriber ID is relayed by the communications system 10 back to SU 101's home gateway, which may be in another part of the world from the gateway closest to SU 101. The home gateway shares SU 101's location data with other components of communications system 10, and these components can store the location data in appropriate computer-readable media.

The home gateway keeps information such as authentication and location for every one of its assigned subscribers. For example, when an SU initiates a communications connection, the satellite network relays the information to the home gateway of that SU for authentication. Once the authentication is approved by the home gateway, a list of gateways is communicated back. The gateways in the list are those visiting gateways that the SU may use to complete its communication, assuming that the SU is not located near its home gateway.

If the destination of the communication is a wireline SU connected to a PSTN at the home gateway, a new communication to the home gateway is set up for completing the communication to the wireline SU. If the destination of the communication is a land-based SU connected to a public switching network at a visiting gateway, a new communication is made to the visiting gateway. Also in a case when the destination of the communication is another system SU, a new communication at a visiting gateway is set up. The communication is made through a series of link relays through the system satellite network to the location of the SU intended to receive the communication, or to the visiting gateway where a PSTN has a connection to the destination SU.

Information destined for another SU, such as SU 102, for example, is assembled at a gateway 20 and is transmitted with routing instructions. This packaged information is transmitted up to a nearby multi-beam satellite 12 via an earth-link 15 and, when necessary, through crosslink 23 to one or more adjacent satellites 120, which can be in the same orbital plane or in an adjacent orbital plane (see FIG. 1), until the information reaches a satellite nearest the target SU, for example SU 102.

Satellite 120 determines from the routing instructions that a particular beam in its antenna pattern 2 should currently be used to communicate with SU 102. Satellite 120 then transmits the packet of information to SU 102. Two-way communications take place between the originating SU 101 and the destination SU 102, using the current servicing beams of satellites 12 and 120.

The satellite constellation is in continuous orbit, and satellites 12 and 120, as depicted in FIG. 2, are assumed to be in the same orbital plane and moving in the direction indicated by arrow 8. Servicing beams of satellite 120 move over the Earth's surface in the direction 8 of the satellites' orbital paths. Eventually, in a known manner which is not relevant to the present invention, communications between satellite 120 and SU 102 will be handed off from one servicing beam to another, and from satellite 120 to satellite 12. Likewise, cell-to-cell handoff and satellite-to-satellite handoff will occur with respect to SU 101.

Were it not for the fact that communications can be conducted through system 10 directly between SUs or with an SU at a remote gateway, a law enforcement agency (LEA) 110 or 111 could conveniently establish a communications intercept or monitoring station at a local gateway 20 to monitor a communication through the local gateway 20.

However, since communications can occur directly between a first SU and a second SU or from a first SU to an SU coupled to a remote gateway through a terrestrial network such as a PSTN, the LEA cannot conveniently establish a communications intercept station at every gateway to monitor the communications originated or terminated at the first SU. Therefore, a local gateway is preferably where intercept can conveniently take place. A local gateway is a gateway close to the location of the SU originating or receiving the communication. However, it is not required that intercept take place in a local gateway, and it can take place in a distant gateway.

The area of the earth depicted by FIG. 2 depicts the intersection of three different jurisdictions identified by areas 401, 402, and 403. Areas 401–403 can be any type of jurisdiction, such as a city, county, state, region, country, or the like. A law enforcement agency (LEA) 110 is associated with jurisdiction 401, and another LEA 111 is associated with jurisdiction 403. LEAs can be of any size, ranging from a single person to a large group of people, and LEAs do not necessarily reside in or have to be associated with any type of building or structure. For example, an LEA can operate within an IF, such as IF 201 or IF 202. Alternatively, an IF can be part of an ordinary gateway 20. Each IF 201 and 202 can conduct communications with overhead satellites via communications links 215 and 216, respectively. Gateway 20 conducts communications with overhead satellites via a communications link 15.

While gateway 20 and IFs 201 and 202 are shown as having tracking antennas, they can utilize any other appropriate type of antennas such as omni-directional antennas, phased-array antennas, or the like.

Figure 3:
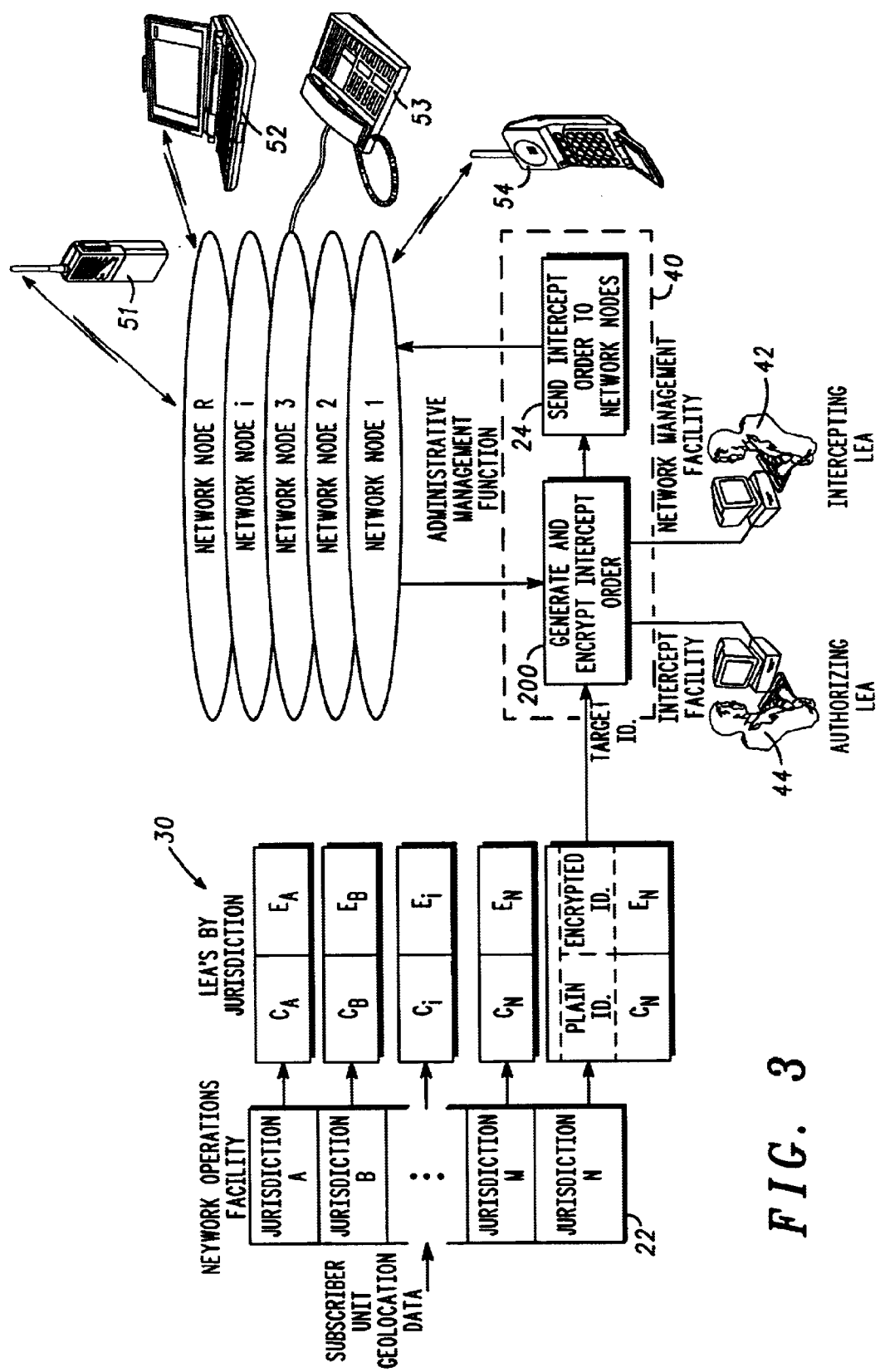
FIG. 3 illustrates a combined block diagram and flow diagram of a communications system and method that can control authorized intercept, according to one embodiment of the invention.

FIG. 3 illustrates a combined block diagram and flow diagram of a communications system and method that can control authorized intercept, according to one embodiment of the invention. Illustrated in FIG. 3 are exemplary elements of a communications system 10 that can be used to implement the invention. While the invention is illustrated in one embodiment as a satellite-based communications system, it can be implemented in any type of communications system.

A network operations facility (NOF) 22 maintains a data structure 30. In one embodiment, NOF 22 is a separate facility within communications system 10, but in other embodiments its function can be integrated into one or more other facilities, such as NMF 24 and/or IF 200. Data structure 30 includes a first portion that comprises a list of SU IDs appearing in unencrypted form. As shown in FIG. 3, the first portion comprises elements $C_A$ through $C_N$ of data structure 30. Element $C_A$ comprises a list of unencrypted (plain) SU IDs for Jurisdiction A, and so on, through element $C_N$, which comprises a list of unencrypted SU IDs for Jurisdiction N.

Data structure 30 also includes a second portion that comprises a list of SU IDs appearing in encrypted form. As shown in FIG. 3, the second portion comprises elements $E_A$ through $E_N$ of data structure 30. Element $E_A$ comprises a list of encrypted SU IDs for Jurisdiction A, and so on, through element $E_N$, which comprises a list of encrypted SU IDs for Jurisdiction N.

Data structure 30 can also include a third portion that comprises location data for each SU. While the lists of plain and encrypted SU IDs illustrated in data structure 30 of FIG. 3 are depicted as organized separately by jurisdiction, they in fact can be stored in any suitable manner, such as in a database in which each record comprises the unencrypted and encrypted forms of an SU ID as well as current location data for the SU.

NOF 22 receives and maintains SU location data according to known techniques. NOF 22 also stores data that defines the boundaries of all jurisdictions in the communications system 10, such as Jurisdictions A through N. Thus, the NOF knows both the location of all SUs in the communications system 10 as well as the boundaries of all jurisdictions covered by communications system 10.

Communications system 10 comprises one or more administrative management functions (AMFs) such as AMF 40. AMF 40 interfaces with LEAs (such as LEA 42) that may require interception in the communications system 10, keeping intercept activities of individual LEAs separate. AMF 40 also interfaces to one or more NOFs (such as NOF 22) for the reception of jurisdictional lists of SU IDs. AMF 40 also interfaces to network nodes (such as network nodes 1–R), for example by sending intercept orders to and receiving intercepted communications from the network nodes. Each AMF can comprise one or more IFs, such as IF 200, and one or more NMFs, such as NMF 24.

A network intercept facility 200 is used by LEAs to order communications intercepts. In one embodiment, IF 200 is a separate facility within communications system 10, but in other embodiments its function can be integrated into one or more other facilities, such as a gateway 20 (FIG. 1) and/or NMF 24. The IF 200 is supplied with the lists of unencrypted and encrypted SU IDs, and the lists are continually updated as SUs are activated or as they move from one jurisdiction to another.

A person belonging to an LEA who desires to intercept communications to a particular SU can obtain permission from a court or other agency to carry out an intercept. The requesting person, or another member of the LEA, can then authorize and order the communications system 10 to carry out the intercept. In one embodiment, an authorizing LEA person 44 communicates an intercept request to IF 200 via an appropriate channel such as a wireline or wireless computer link or telephone link.

In response to receipt of an intercept request from authorizing LEA person 44, IF 200 selects the target SU ID (including both the plain and encrypted forms of the target SU ID), generates an intercept order including the encrypted SU ID, encrypts the intercept order, and transmits the encrypted intercept order to NMF 24.

NMF 24 sends encrypted intercept orders to one or more network nodes 1–R. In one embodiment, NMF 24 is a separate facility within communications system 10, but in other embodiments its function can be integrated into one or more other facilities, such as an NOF 22, IF 200, and/or gateway 20 (FIG. 1).

An encrypted intercept order can be received by one or more network nodes 1–R. In one embodiment, network nodes 1–R are responsible for conducting communications directly with SUs that are located within their coverage area. For example, network node 1 can be a satellite in whose coverage area an SU, such as satellite phone 54, is currently located. Network node 3 can be a terrestrial facility located close to an SU, such as wireline phone 53. Network node R can be a terrestrial cell site or computer network node from which it is convenient to conduct communications with a wireless or wireline computer 52 and with a wireless SU 51 of any type.

A network node 1–R receiving an encrypted intercept order directed to an SU within its coverage area attempts to decrypt the encrypted intercept order, using a key which is known only to network nodes 1–R (or a subset thereof) and to the IF 200 that generated and encrypted the encrypted intercept order. The network node also attempts to decrypt the encrypted SU ID that is included in the encrypted intercept order, using a key that is known only to network nodes 1–R (or a subset thereof) and to the NOF 22 that generated the lists of plain and encrypted SU IDs.

If successful in decrypting the encrypted intercept order and the encrypted SU ID of the target intercept SU, the particular network node executes the communications intercept and directs intercepted communications back to the IF 200 or other entity that originated the intercept order. The IF 200 communicates the intercepted communications to an intercepting LEA person 42 via an appropriate link such as a wireline or wireless computer link or telephone link. Alternatively, the intercepted communications can be linked directly with an intercepting LEA person 42 without going through an IF 200.

The particular structures and processes depicted in FIG. 3 are merely illustrative of one embodiment of the invention, and other implementations will be apparent to those of ordinary skill in the art.

Figure 4:
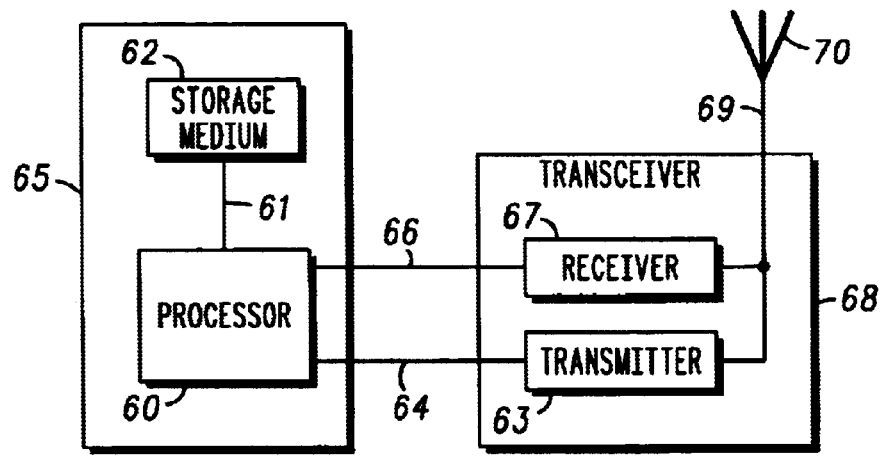
FIG. 4 illustrates a simplified block diagram of an earth-based radio communication station suitable for use in one embodiment of the present invention.

FIG. 4 illustrates a simplified block diagram of an earth-based radio communication station suitable for use in one embodiment of the present invention. Several different types of earth stations can be provided to implement a communications system in which authorized intercepts can be controlled, depending upon the system's functional and cost requirements. For example, earth stations can take the form of a network management facility (NMF) 24, a gateway 20, and a network intercept facility (IF) such as IF 201 or IF 202. Other types of earth stations can be employed in the system, such as network operations facilities (NOF 22, FIG. 3); telemetry, tracking, and control (TTAC) facilities (not shown); and the like. Alternatively, the functions provided by some or all of the earth stations can be combined in any suitable manner.

Earth stations can be differentiated by the various functions they perform. However, each earth station typically includes at a minimum the components shown in FIG. 4. Thus an earth station comprises a data processing system 65 having at least one processor 50 coupled via a link 61 to a storage medium 62 (e.g., random access memory or RAM, other semiconductor or magnetic read-write memory devices, optical disk, magnetic tape, floppy disk, hard disk, etc.).

Storage medium 62 comprises a computer-readable medium that stores computer programs and data structures comprising variables, tables, and databases, that are executed, accessed, updated, and manipulated during the operation of communications system 10. With particular regard to the present invention, storage medium 62 stores data structures, such as data structure 30 of FIG. 3, wherein lists of SU IDs are organized and stored. The data structures include a list of SU IDs appearing in unencrypted form, and they also include the list of SU IDs appearing in encrypted form.

The data structures can be organized in any suitable way. In one embodiment, the data structures are organized into records, which indicate location data for each SU ID. Each SU ID is associated with a particular jurisdiction within which the corresponding SU resides, either in a physical or logical sense. For example, with reference to FIG. 2, SU 101 can be associated with jurisdiction 401, whereas SU 102 can be associated with jurisdiction 403.

The earth station also typically includes an earth terminal transceiver 68 that comprises an antenna 70 coupled to transmitter 63 and receiver 67 via link 69. Transmitter 63 and receiver 67 are coupled to processor 60 via links 64 and 66, respectively.

While in one embodiment processor 60 and storage medium 62 are contained within the earth terminal, this is not essential. The central processing functions and memory functions can be distributed or concentrated elsewhere in the system. For example, a master control station can be used, and some or all of the computing, management, and intercept functions described above can be concentrated therein. Alternatively, these functions can be distributed among various levels of the system in a hierarchical network, each level being responsible for computing, managing, and intercepting communications at its own level.

Processor 60 desirably carries out procedures exemplified herein and described in the associated text. For example, in addition to performing other tasks as appropriate, processor 60 desirably stores results from such procedures in storage medium 62. Transmitter 63 and/or receiver 67 transmit communications to and/or receive communications from satellites 12.

Figure 5:
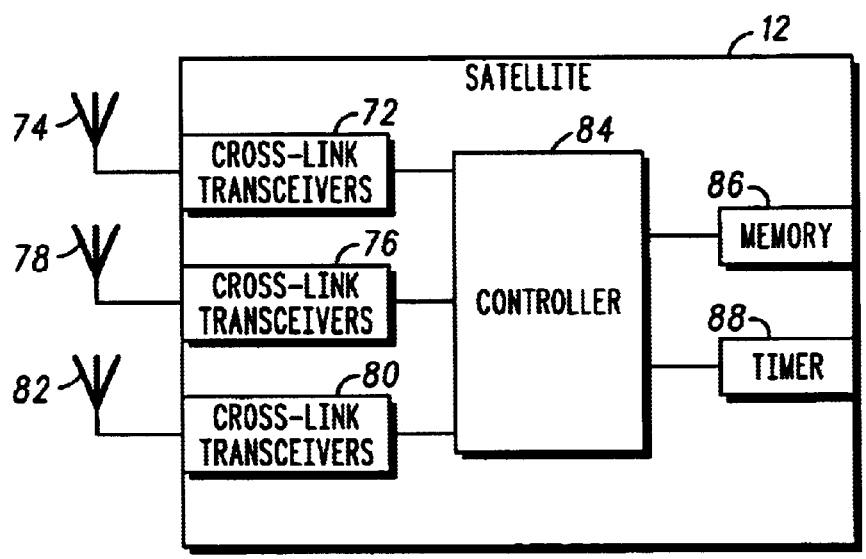
FIG. 5 illustrates a simplified block diagram of a satellite-based radio communication station suitable for use in one embodiment of the present invention.

In addition to managing processes associated with SU IDs, processor 60 generally controls and manages subscriber access, message reception and transmission, channel set-up, radio tuning, channel assignment, and other communication and control functions not managed or provided for by controller 84 (FIG. 5).

FIG. 5 illustrates a simplified block diagram of a satellite-based radio communication station suitable for use in one embodiment of the present invention. Preferably, all satellites 12 within system 10 (see FIG. 1) include equipment as illustrated by the block diagram of FIG. 5. Satellite 12 includes crosslink transceivers 72 and associated antennas 74. Transceivers 72 and antennas 74 support crosslinks to other nearby satellites 12.

Earth-link transceivers 76 and associated antennas 78 support earth-links to communicate with earth stations such as NMF 24 (FIG. 1), gateways 20, and other types of earth stations (not shown). SU transceivers 80 and associated antennas 82 support SUs 1 (FIG. 1). Preferably, each satellite 12 can simultaneously support a link for up to several thousand or more of SUs 1 (FIG. 1). Of course, those skilled in the art will appreciate that antennas 74, 78, and 82 can be implemented as single multi-directional antennas or as banks of discrete antennas. In one embodiment each subscriber link antenna 82 is a phased array antenna capable of accessing many cells simultaneously.

SU transceivers 80 are desirably multi-channel transceivers capable of transmitting and receiving on different channels, according to a suitable channel diversity scheme, such as Frequency Division Multiple Access (FDMA), Time Division Multiple Access (TDMA), Code Division Multiple Access (CDMA), or other channel diversity schemes or combinations thereof. SU transceivers 80 contain multi-channel radios having a sufficient number of channels to provide the desired number of transmission and reception channels for signal access and control, and for the subscriber communications. Controller 84 can provide for channel allocation, cell-to-cell hand-off, and other overhead, management, and control functions.

A controller 84 is coupled to each of transceivers 72, 76, and 80 as well as to a memory 86 and a timer 88. Controller 84 can be implemented using one or more processors. Controller 84 uses timer 88 to maintain, among other things, the current date and time. Memory 86 comprises a computer-readable medium that stores computer programs and data structures comprising variables, tables, and databases, that are executed, accessed, updated, and manipulated during the operation of communications system 10. The computer programs, when executed by controller 84, cause satellite 12 to carry out certain of the communication intercept procedures, which are discussed herein.

For example, controller 84 of the satellite 12 (FIG. 3) that is providing communications to a particular intercept target SU can access a decryption key stored in memory 86 to decrypt an encrypted intercept order received from an entity within the communications system 10, such as from NMF 24. This key is known only to satellites 12 and to the IF 200 (FIG. 3) that encrypted it. Thus, the servicing satellite 12 can be assured that the intercept order came from a trusted source, namely an IF. The key can either be distributed to all satellites 12 or to a subset of satellites 12, including just one satellite 12, depending upon the type of constellation.

Controller 84 can also access a decryption key stored in memory 86 to decrypt an encrypted SU ID received from an entity within the communications system 10, such as from NMF 24. This key is known only to satellites 12 and to the NOF 22 that encrypted it. Thus, the servicing satellite 12 can be assured that the SU ID is for an SU in a jurisdiction for which intercept is authorized.

While, in FIG. 5, a network node in the communications system has been described as implemented by a satellite-based radio communication station, in a non-satellite-based communications system a suitable network node that can receive and decrypt encrypted intercept orders can be implemented in terrestrial-based equipment, e.g. a cellular telecommunications site or a computer network node. Such equipment can utilize equivalent transceiver and data processing equipment as is depicted in FIG. 5 for the satellite-based radio communication station. It will be apparent to one of ordinary skill in the art how to design, construct, and operate such equipment in view of the disclosure herein.

The encryption and decryption functions can be implemented in any suitable way, for example by using a public key encryption algorithm such as RSA, Diffie-Hellman, Elliptic, and the like.

Figure 6:
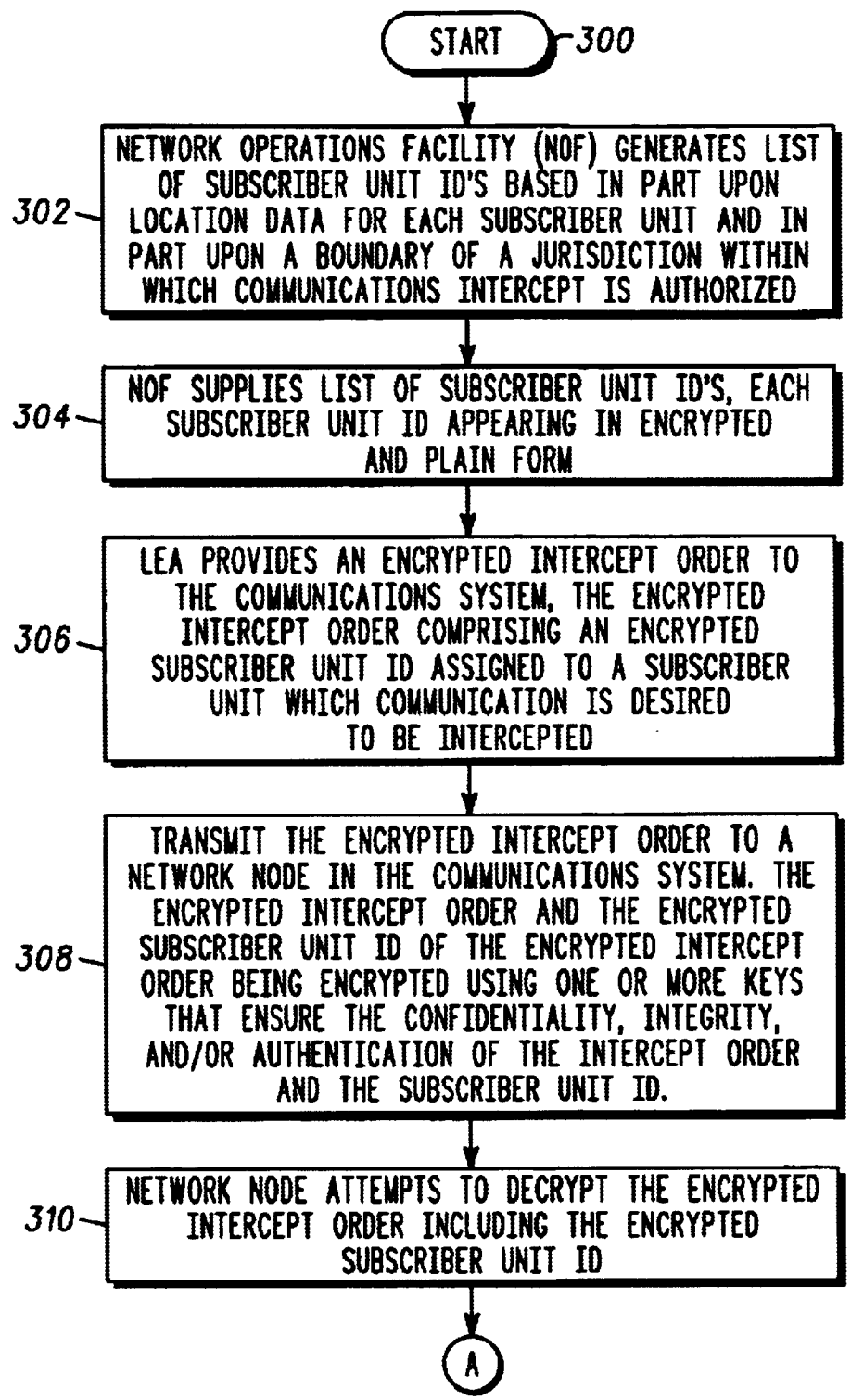
FIGS. 6–7 together show a flow chart for a method of operating a communications system that can control authorized intercept, according to one embodiment of the invention.
Figure 7:
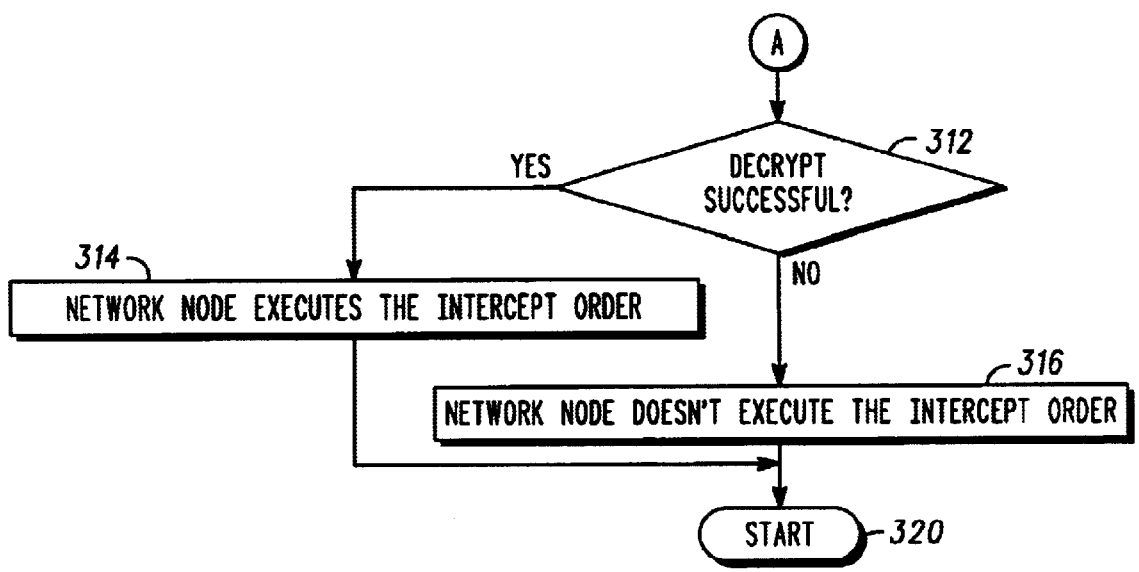

FIGS. 6–7 together show a flow chart for a method of operating a communications system that can control authorized intercept, according to one embodiment of the invention.

Referring first to FIG. 6, the method starts in block 300. In 302, a trusted entity, such as a network operations facility (NOF), generates a list of SU IDs. The SU IDs are generated in part based upon location data, which are maintained for each SU, as explained earlier. The SU IDs are also generated in part based upon a boundary, such as but not limited to a geographical boundary, of a jurisdiction within which a communications intercept is authorized. That is, the NOF knows both the location of all SUs in the communications system 10 as well as the boundaries of all jurisdictions covered by communications system 10. The NOF stores data in a data structure 30 which can be organized as illustrated in FIG. 3 and described above.

In 304, the NOF supplies a list of SU IDs. Each SU ID appears both in unencrypted (plain) form and in encrypted form.

In 306, a law enforcement agency (LEA) provides an encrypted intercept order to the communications system 10. The encrypted intercept order comprises an encrypted SU ID that is assigned to an SU whose communications it is desired to intercept. In one embodiment, the LEA provides the encrypted intercept order to the communications system 10 through an appropriate request to an IF 200 (FIG. 3). However, the particular vehicle by which an encrypted intercept order is provided to the communications system 10 is an implementation detail. For example, an LEA could provide the intercept order to the NOF, NMF, or to another system node.

In 308, the encrypted intercept order is transmitted by the NOF to a network node (such as a satellite 12 in the case of a satellite-based implementation of a communications system) in the communications system 10. The transmission can go directly to the network node or via intermediary nodes, such as a network management facility (NMF 24, FIG. 3).

The encrypted intercept order and the encrypted SU ID of the encrypted intercept order have one or more keys that assure the confidentiality, integrity, and/or authentication of the intercept order and the SU ID. Either symmetrical or asymmetrical encryption schemes can be used. In a symmetrical encryption scheme, for example, the encrypted intercept order is encrypted using a key that is known only to the NOF and to the network node, and the encrypted intercept order is encrypted using a key that is known only to the network node and to the LEA that originated the encrypted intercept order. In an asymmetrical encryption scheme, the encrypting and decrypting entities use different keys. One entity can use, for example, a public key, and the other entity can use a private key. In one embodiment of the invention, encrypting is performed with a public key, and decryption is performed with a private key. The inverse can also be implemented, wherein encrypting is performed with a private key, and decryption is performed with a public key, for authentication and/or integrity purposes.

In 310, the network node attempts to decrypt the encrypted intercept order, including the encrypted SU ID.

Referring now to 312 of FIG. 7, if the decryption is successful, the method proceeds to 314; otherwise, it goes to 316. The decryption of the encrypted subscriber unit ID is deemed to be "successful" if the authenticity, confidentiality, and/or integrity of the subscriber unit ID are assured. That is, an encryption scheme (either symmetrical or asymmetrical) is used which assures that the identity of an SU ID that has been targeted for intercept by an intercept order is maintained confidential as that SU ID is sent through the communications system, so that its identity is known only to the requesting IF and to the network node that is to execute the intercept order. Likewise, the authenticity of the SU ID, as originating from a trusted NOF, is maintained, so that the executing network node knows with assurance that the targeted SU is within an authorized jurisdiction. In addition, the integrity of a target SU ID, as well as that of an intercept order containing it, are maintained, so that the executing network node knows that the target SU ID and the intercept order have not been improperly modified.

In 314, the network node executes the intercept order. In one embodiment, the network node can execute the intercept order by directing intercepted communications to the LEA or other entity that originated the encrypted intercept order through an appropriate system node, for example, an IF 200 (FIG. 3).

In 316, if the network node cannot decrypt the encrypted intercept order, including the encrypted SU ID, then it doesn't execute the intercept order, and the method ends in 320.

It will be understood by those skilled in the art that the operations of the methods shown and described herein can be carried out in a different order than those described with reference to FIGS. 6–7. It will also be understood that while the flowchart has "Start" and "End" blocks, in general the method that it depicts is continuously performed.

CONCLUSION

Thus there have been described above systems and methods for controlling communications intercepts within a communications system while maintaining the secrecy of target SU identities and maintaining intercepts within jurisdictions that are authorized for requesting law enforcement agencies.

The system and method are quite versatile and can be implemented in any type of communications system. As described herein, the advantages of the present invention will be apparent to those of skill in the art and will provide improved systems and methods for controlling communications intercepts within a communications system.

While the invention has been described in terms of specific examples, it is evident that many alternatives and variations will be apparent to those skilled in the art based on the description herein, and it is intended to include such variations and alternatives in the claims.

What is claimed is:

1. A method of controlling communications intercepts in a communications system comprising the steps of:
    maintaining a list of subscriber unit IDs at a network intercept facility, each subscriber unit ID appearing in encrypted and plain form, and
    providing an encrypted intercept order from the network intercept facility to the communications system, the encrypted intercept order comprising the encrypted form of the subscriber unit ID assigned to a subscriber unit whose communication is desired to be intercepted and wherein the encrypted intercept order is encrypted separately from the encrypted subscriber unit ID.

2. The method recited in claim 1, wherein a network operations facility in the communication system generates the list of subscriber unit IDs based in part upon location data for each subscriber unit whose subscriber unit ID appears on the list, and in part upon a boundary of a jurisdiction within which a communications intercept is authorized.

3. The method recited in claim 2, wherein the subscriber unit ID of the encrypted intercept order is encrypted in a key that is known only to the network operations facility and the network node, and wherein the encrypted intercept order is encrypted in a key that is known only to the network intercept facility and the network node.

4. The method recited in claim 3 and further comprising the step of:
    decrypting the encrypted intercept order that includes the encrypted subscriber unit ID.

5. The method recited in claim 4 and further comprising the steps of:
    the network node attempting to decrypted subscriber unit ID;
    if successful, the network node executing the intercept order; and
    if not successful, the network node not executing the intercept order.

6. The method recited in claim 2 and further comprising:
    a network intercept facility transmitting the intercept order encrypted for a network node in the communications system, the subscriber unit ID within the encrypted intercept order being encrypted by the network operations facility for the network node.

7. The method recited in claim 6 and further comprising:
    the network node decrypting the encrypted intercept order that includes the encrypted subscriber unit ID.

8. The method recited in claim 7 and further comprising:
    the network node attempting to decrypt the encrypted subscriber unit ID;
    if successful, the network node executing the intercept order; and
    if not successful, the network node not executing the intercept order.

9. The method recited in claim 8 wherein the operations are performed in the order recited.

10. A communications system comprising at least one data processing system executing at least one computer program controlling intercepts in the communications system, the at least one computer program when executed comprising the operations of:
    maintaining a list of subscriber unit IDs, each subscriber unit ID appearing in encrypted and plain form, and
    providing an encrypted intercept order from the data processing system to the communications system, the encrypted intercept order comprising an encrypted subscriber unit ID assigned to a subscriber unit whose communication is desired to be intercepted, and wherein the encrypted intercept order is encrypted separately from the encrypted subscriber unit ID.

11. The communications system recited in claim 10 and further comprising:
    a network operations facility that generates the list of subscriber unit IDs based in part upon location data for each subscriber unit whose subscriber unit ID appears on the list, and in part upon a boundary of a jurisdiction within which a communication intercept is authorized.

12. The communications system recited in claim 11 and further comprising:
    network intercept facility that receives the list of subscriber unit IDs from the network operations facility, the network intercept facility generating the encrypted intercept order.

13. The communications system recited in claim 12 and further comprising:
    a network node that receives the encrypted intercept order from the network intercept facility.

14. The communications system of claim 13 and further comprising:
    a network management facility coupled between the network intercept facility and the network node.

15. The communications system recited in claim 13 wherein the network node decrypts the encrypted intercept order that includes the encrypted subscriber unit ID.

16. The communications system recited in claim 15 wherein if the network node decrypts the encrypted subscriber unit ID in the intercept order, it executes the intercept order.

17. A communications facility adapted to be used in a communications system in which communications intercepts are executed, the communications facility comprising:
    at least one data processing system; and
    a computer-readable data structure, accessible by the at least one data processing system, and comprising a list of subscriber unit IDs, each subscriber unit ID appearing in encrypted and plain form; and a computer program executable by the at least one data processing system to thereby generate an intercept order to intercept a communication with a subscriber unit whose subscriber unit ID is in the computer-readable data structure, wherein the intercept order comprises the encrypted form of the subscriber unit ID of the subscriber unit, and wherein the intercept order is encrypted separately from the subscriber unit ID.

18. The communication facility recited in claim 17 and further comprising a computer program executable by the at least one data processing system for generating and maintaining the computer-readable data structure.

19. The communication facility recited in claim 17 and further comprising a computer program executable by the at least one data processing system for encrypting the intercept order.

20. The communications facility recited in claim 17 and further comprising a computer program executable by the at least one data processing system for transmitting an intercept order to a node in the communications system.

21. The communications facility recited in claim 17 and further comprising a computer program executable by the at least one data processing system for decrypting and executing and intercept order.

22. The communications facility recited in claim 17 wherein the data structure further comprises location data for subscriber units whose subscriber unit IDs appear in the data structure.

23. A computer-readable medium comprising at least one computer program adapted for use in a communications system in which communications are intercepted, the at least one computer program when executed comprising the steps of:

attempting to decrypt an encrypted intercept order received from an entity within the communications system, the encrypted intercept order comprising an encrypted subscriber unit ID, wherein the encrypted subscriber unit ID is encrypted in part based upon location data and in part based upon a boundary of a jurisdiction within which a communications intercept is authorized;

if successful, decrypting the encrypted subscriber unit ID contained within the intercept order and executing the intercept order to thereby intercept information that is communicated to and from a subscriber unit having the decrypted subscriber unit ID; and if not successful, not executing the intercept order.

24. The computer-readable medium recited in claim 23 wherein the at least one computer program when executed further comprises the operation of:

directing intercepted information to the entity.

25. A method of performing a lawful intercept of a subscriber unit operating within a communications system, wherein the subscriber unit has a subscriber unit ID assigned by a network operations facility, the method comprising the steps of:

receiving encrypted intercept order from an intercept facility;

decrypting the encrypted intercept order with a key associated with the intercept facility to produce a decrypted intercept orders;

extracting the subscriber unit ID in encrypted form from the decrypted intercept order;

decrypting the subscriber unit ID with a key associated with the network operations facility; and performing the lawful intercept of the subscriber unit identified by the decrypted subscriber unit ID.

* * * * *